(12) United States Patent
Jelvis et al.

(10) Patent No.: US 8,589,913 B2
(45) Date of Patent: Nov. 19, 2013

(54) TRACKING BLOCK-LEVEL WRITES

(75) Inventors: Alexei Jelvis, Menlo Park, CA (US); Ilia Langouev, Santa Cruz, CA (US); Ping Lu, Mountain View, CA (US); Aleksey Vasilyevich Pershin, Fremont, CA (US); Erik Weathers, San Jose, CA (US)

(73) Assignee: VMware, Inc., Palo alto, CA (US)

( * ) Notice: Subject to any disclaimer, the term of this patent is extended or adjusted under 35 U.S.C. 154(b) by 782 days.

(21) Appl. No.: 12/730,343

(22) Filed: Mar. 24, 2010

(65) Prior Publication Data

US 2011/0088027 A1 Apr. 14, 2011

Related U.S. Application Data

(60) Provisional application No. 61/251,647, filed on Oct. 14, 2009.

(51) Int. Cl.
*G06F 9/44* (2006.01)
*G06F 9/45* (2006.01)
*G06F 13/00* (2006.01)

(52) U.S. Cl.
USPC ........... 717/174; 717/108; 717/165; 717/177; 711/162

(58) Field of Classification Search
None
See application file for complete search history.

(56) References Cited

U.S. PATENT DOCUMENTS

| | | | | |
|---|---|---|---|---|
| 5,363,487 A * | 11/1994 | Willman et al. | | 710/8 |
| 5,471,408 A * | 11/1995 | Takamoto et al. | | 703/2 |
| 6,976,252 B2 * | 12/2005 | White et al. | | 717/174 |
| 7,082,598 B1 * | 7/2006 | Le et al. | | 717/127 |
| 7,246,200 B1 * | 7/2007 | van Rietschote et al. | | 711/114 |
| 7,370,164 B1 * | 5/2008 | Nagarkar et al. | | 711/162 |
| 7,447,854 B1 * | 11/2008 | Cannon | | 711/162 |
| 7,793,279 B1 * | 9/2010 | Le et al. | | 717/168 |
| 8,060,872 B2 * | 11/2011 | Da Silva Neto | | 717/177 |
| 8,127,174 B1 * | 2/2012 | Shah et al. | | 714/13 |
| 2002/0120924 A1 * | 8/2002 | Miloushev et al. | | 717/165 |
| 2005/0210463 A1 * | 9/2005 | Abe | | 717/174 |
| 2007/0260831 A1 * | 11/2007 | Michael et al. | | 711/162 |
| 2007/0271428 A1 * | 11/2007 | Atluri | | 711/162 |
| 2008/0162590 A1 * | 7/2008 | Kundu et al. | | 707/202 |
| 2008/0222375 A1 * | 9/2008 | Kotsovinos et al. | | 711/162 |
| 2008/0256314 A1 * | 10/2008 | Anand et al. | | 711/162 |
| 2009/0249289 A1 * | 10/2009 | Akritidis et al. | | 717/108 |

OTHER PUBLICATIONS

Christian Plattner et al., "Ganymed: Scalable Replication for Transactional Web Applications", [Online], 2004, pp. 1-20, [Retrieved from Internet on Jul. 23, 2013], <http://www.distcomp.ethz.ch/lectures/hs08/seminar/papers/alonso1.pdf>.*

Dutch T. Meyer et al., "Parallax Virtual Disks for Virtual Machines", [Online], 2008, pp. 1-14, [Retrieved from Internet on Jul. 23, 2013], <http://www.cs.ubc.ca/~dmeyer/parallax-eurosys-final.pdf>.*

Shantanu Goel et al., "Linux Device Driver Emulation in Match" [Online], 1996, pp. 1-9, [Retrived from Internet on Jul. 23, 2013], <http://citeseerx.ist.psu.edu/viewdoc/download?doi=10.1.1.53.7252&rep=rep1&type=pdf>.*

Stephen McLaughlin et al., "Rootkit-Resistant Disks", [Online], 2008, pp. 403-415, [Retrieved from Internet on Jul. 23, 2013], <https://wiki.smu.edu.sg/w/flyer/images/d/de/RootkitResistantDisks_CCS08.pdf>.*

* cited by examiner

*Primary Examiner* — Thuy Dao
*Assistant Examiner* — Ziaul A Chowdhury

(57) ABSTRACT

One embodiment is a method of installing a block-level write tracking driver in a Microsoft Windows™ operating system so that no reboot of the system is need, another embodiment is a method of installing a block-level write tracking driver in a Linux operating system so that no reboot of the system is needed, and still another embodiment is a method of tracking block-level writes to snapshots under newer Microsoft Windows™ operating systems.

14 Claims, 3 Drawing Sheets

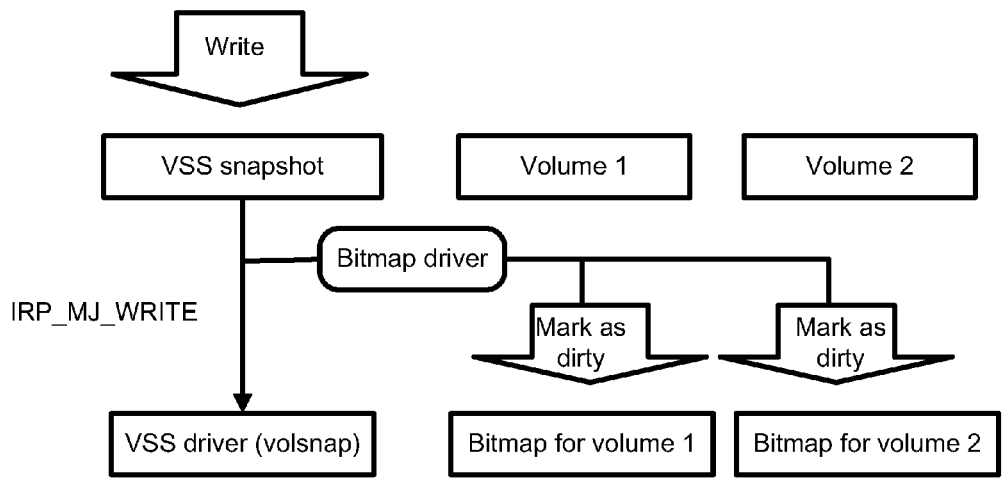

Figure 5

```
void* PatchPointer (void** address, void* driverValue)
{
        void* oldValue;
        bool replaced;

do
        {
                oldValue = (*address);
                replaced = InterlockedCompareExchangePointer(address, oldValue, driverValue);
        } while (!replaced);

return oldValue;
}
```

Figure 6

```
bool RestorePointer (void** address, void* oldValue, void* driverValue)
{
        bool replaced = InterlockedCompareExchangePointer(address, driverValue, oldValue);
        return replaced;
}
```

Figure 7

TRACKING BLOCK-LEVEL WRITES

This patent application relates to a U.S. Provisional Application having Appl. No. 61/251,647 which was filed Oct. 14, 2009, from which priority is claimed under 35 USC §119(e).

TECHNICAL FIELD

One or more embodiments of the present invention relate to tracking block-level writes.

BACKGROUND

A "physical machine to virtual machine converter for disaster recovery" module ("P2V-DR" module) such as a VMware vCenter Converter software module that is available from VMware, Inc. of Palo Alto, Calif. converts a physical machine to a virtual machine and creates and stores an image of the created virtual machine ("VM"). As such, a P2V-DR module extends disaster recovery strategies to physical machines in a data center by allowing images of physical machines to be archived at remote sites, i.e., the P2V-DR module enables a user to use a VM as a backup for a physical system. An advantage of having a backup VM is an effectively zero recovery time since, in case of a disaster, the user only needs to power up the backup VM to recover. Also, with the backup being a VM, one can maintain multiple backup images (for example, as VM snapshots), and even test the backup VM by powering it up in an isolated virtual network.

A P2V-DR module typically starts with a full "physical machine to virtual machine" ("P2V") conversion. After that, the P2V-DR module creates incremental backups, for example, on a periodic basis, to transfer ongoing changes from the source system to a target VM. The P2V-DR module typically uses block-level write tracking to determine which blocks were changed between backup cycles.

In another example, a P2V conversion is usually performed by taking a snapshot of the source system, and then cloning the snapshot to the target VM. Effectively, this means that the target VM represents the state of the source system at the moment the P2V conversion process started. If there were any changes in the source system during the cloning process, these changes would be missing from the target VM. Consequently, a user must take the source system out of production before migrating it to a target VM to avoid losing any data. For a typical server, a full P2V conversion could take many hours. Thus, the user has to schedule at least a day of server downtime. But, using a P2V Motion software module, for example a P2V Motion software module contained in the VMware vCenter Converter software module that is available from VMware, Inc. of Palo Alto, Calif., this downtime (i.e., the time between ending use of the source system to generate a target VM and completing the VM generation process) can be shortened to a few minutes.

The P2V Motion software module starts block-level write tracking on the source system before starting a full P2V conversion. After that, the P2V Motion software module proceeds with the full P2V conversion. Once the full P2V conversion is completed, the P2V Motion software module performs a "catch-up" phase. In the catch-up phase, the P2V Motion software module uses tracking information provided by a block-level write tracking driver, and transfers all changed blocks to the target VM. Thus, the duration of the downtime becomes equal to the duration of the catch-up phase.

Block-level write tracking is usually implemented in a Microsoft Windows™ operating system as follows (referred to herein as "Windows"). Windows divides all devices into classes, and each device class has a globally unique identifier ("GUID"). For each device class GUID, there is a place in the Windows registry where Windows maintains a list of upper (and lower) filter drivers for this device class. If a driver wants to filter requests to a particular device class, it needs to add itself to the list of upper or lower filter drivers for this device class.

When Windows discovers a new device, it first asks the device driver to create a device object (called a functional device object) for the new device. After that, Windows enumerates all filter drivers registered for the device object class, and asks each filter driver to create a filter device object for the new device. As is known, a filter driver is a driver/program/module that inserts a filter device object into a device stack to perform some specific function. Any number of filter drivers can be added to Windows—upper level filter drivers sit above the primary driver for the device (the functional driver), while lower level filter drivers sit below the functional driver and above the bus driver. Eventually, all device objects form a device stack, refer to FIG. 1. Note that the order in which filter device objects are positioned in the device stack is not specified nor guaranteed by Windows.

As is known, whenever an operation is performed on a device, Windows passes an I/O request packet ("IRP") data structure to a driver corresponding to the top device object in the device stack. Each driver either handles the IRP or passes it to the driver that is associated with the next-lower device object in the device stack. Once the IRP reaches the functional device object, the corresponding device driver carries out the requested command, and marks the IRP as completed. Once the IRP is marked as completed, Windows walks the device stack from the bottom to the top and notifies each filter driver that the IRP has been completed.

Usually, a write tracking driver (i.e., a driver that tracks block-level writes to volumes in the system) needs to register itself as an upper filter driver (referred to as a write tracking filter driver) to a device class called "Generic Storage Volume." Then, when a new volume appears in the system, Windows calls the write tracking driver to create a corresponding write tracking filter device object. Then, the write tracking driver can monitor all requests coming through this write tracking filter device object and perform special processing for write requests, for example, by maintaining a bitmap of blocks that have been changed since a particular moment in time (for example, such a write tracking driver may be referred to herein as a bitmap driver).

Using the above-described "upper filter approach" in Windows requires the source system to be rebooted for the write tracking driver to start tracking block-level writes. Because a reboot cycle for a production server carrying a heavy load could take a long time (resulting in a long downtime period), finding a time slot for such a long downtime period could be problematic for such a production server or for a production server responsible for mission critical applications. In particular, in the case where a P2V-DR module is used, no backup protection could be configured until the source system was rebooted. Since downtime is usually scheduled during the night, but setting up to run the P2V-DR module on the source system is usually done during the day, a long downtime due to a need to reboot could delay the availability of a fully functional backup VM for several days. This could be costly if a disaster happens. In the case of use of a P2V Motion software module, any server downtime is usually unacceptable because the main reason for the user to use the P2V Motion software module in the first place is to avoid server downtime.

Tracking writes in Windows may be problematic for another reason. In particular, Windows provides a standard mechanism for taking a snapshot of a running system that is provided by a Volume Shadow Copy Service ("VSS"). On one hand, VSS provides a generic snapshotting API, and on the other hand, it provides a callback API (called writer API) for any database (or any other application maintaining open files) to participate in the snapshot creation process and to create a consistent image of the system.

In Windows XP and Windows 2003, VSS requires all writers (i.e., applications that want to be aware of the snapshot—typically database applications) to flush data directly to the volumes for which a snapshot will be created ("working volumes") just before VSS creates the snapshot. This enables the writers to make sure the "working volume" has the data the writers want to be on the "working volume" before the snapshot is created. Then, once the snapshot is created, VSS allows the writers to continue accessing the "working volume." Since it may take up to several minutes to create a snapshot, the availability of a server could be negatively affected while the snapshot is being created. However, starting with Windows Vista (i.e., Windows Vista, Windows 2008 and Windows 7), VSS allows writers to write directly to the snapshot without flushing to the "working volume" itself. This enables VSS to create a snapshot much faster and without affecting the server's availability.

However, a problem with using VSS is that "directly-to-the-snapshot" writes occur only while the snapshot is being created and before it is made available to an application requesting the snapshot (typically an application performing a backup). If the backup application uses a write tracking filter driver attached to the "working volume" to track block-level writes, the write tracking filter driver will miss snapshot writes. Consequently, if the backup application were to copy from the snapshot only those blocks that were reported by the write tracking filter driver, the backup image would be incomplete and inconsistent. Unfortunately, VSS creates snapshots in an unusual way in that snapshot volumes are not considered regular storage volumes and thus cannot have a filter driver attached to them.

Linux

Block-level write tracking is usually implemented in the Linux operating system (referred to herein as "Linux") by adding a block-level filter driver through a "Device Mapper." The Device Mapper is a kernel component which could transform a block I/O ("BIO") request based on different policies. By transforming a BIO request, a Device Mapper device could remap the request to a different address, to a different block device, or simply perform some bookkeeping task and then pass the request to the underlying device. A Device Mapper device is itself a block device, and stacking them is allowed, refer to FIG. 2.

To track writes to a block device in Linux, one can instantiate a write tracking Device Mapper device stacked on top of the block device. Then, whenever the write tracking Device Mapper device receives a BIO write request, it tracks the write, for example, with a bitmap of changed blocks and, after that, it passes the BIO write request down to the underlying block device. In addition, to track writes to a block device, Linux needs to be told to access the write tracking device instead of the block device itself. Thus, if a file system is already mounted on the block device, it would have to be remounted to the write tracking device.

At boot time, Linux selects the block devices on which its file systems mount by looking at a File System Table (fstab). By changing the block device on which a specific file system mounts to a write tracking device in fstab, write tracking will occur after the next reboot.

Thus, modifying the fstab in Linux requires the source system to be rebooted for a write tracking driver to start tracking block-level writes. This is problematic for the same reasons discussed above with respect to Windows.

Tracking writes in Linux may be problematic for another reason. In particular, tracking writes to the boot volume in Linux may occur as follows. When a Linux operating system is started, a boot loader (usually GRUB) is responsible for loading an image of the Linux kernel together with the core drivers from the boot volume into memory. Consequently, the boot loader must have a built-in driver to access a block device with the boot volume. If this block device were provided by a write tracking Device Mapper device, the boot loader would not know how to access the boot device because GRUB would not know about the write tracking Device Mapper device. GRUB has built-in support for IDE and SCSI block devices. Thus, short of writing one's own boot loader, there is no way to add another driver to GRUB to access a custom filter block device. As a result of this limitation, it is impossible for a backup application to track block-level writes to the boot volume. The situation is aggravated by the fact that in some Linux distributions the boot volume is combined with the root volume which contains the entire Linux installation and most of the applications.

To solve this problem, some backup applications require the boot volume to be separated from the root volume. However, this requires careful advanced planning and may prevent a user from using the backup application on an existing server without reinstalling the entire system. Other backup applications choose to back up the boot volume non-incrementally during each backup cycle. However, if the boot volume is combined with the root volume, this could result in large amounts of data being backed up unnecessarily during each backup cycle.

SUMMARY

One or more embodiments of the present invention solve one or more of the above-identified problems. In particular, one embodiment of the present invention is a method of installing a block-level write tracking driver which tracks writes to a volume in a Microsoft Windows™ operating system, the method comprising: the write tracking driver: (a) finding a block device stack corresponding to the volume; (b) selecting a device object in the block device stack; (c) accessing a driver object pointed to by the device object; and (d) replacing a function pointer entry in a dispatch table in the driver object. Another embodiment of the present invention is a method of installing a block-level write tracking driver which tracks writes to a block device in a Linux operating system, the method comprising: the write tracking driver: (a) finding a block device structure corresponding to the block device; (b) accessing a request queue in the block device structure; and (c) replacing a function pointer entry in the request queue.

BRIEF DESCRIPTION OF THE DRAWINGS

FIG. 5 is a block diagram showing how a bitmap driver operates in a "promiscuous" mode to perform write tracking in accordance with one or more embodiments of the present invention.

FIG. 6 shows pseudo code used by a write tracking driver to patch a function pointer entry in accordance with one or more embodiments of the present invention.

FIG. 7 shows pseudo code used by a write tracking driver to restore a function pointer entry in accordance with one or more embodiments of the present invention.

DETAILED DESCRIPTION

Windows

Figure 1:
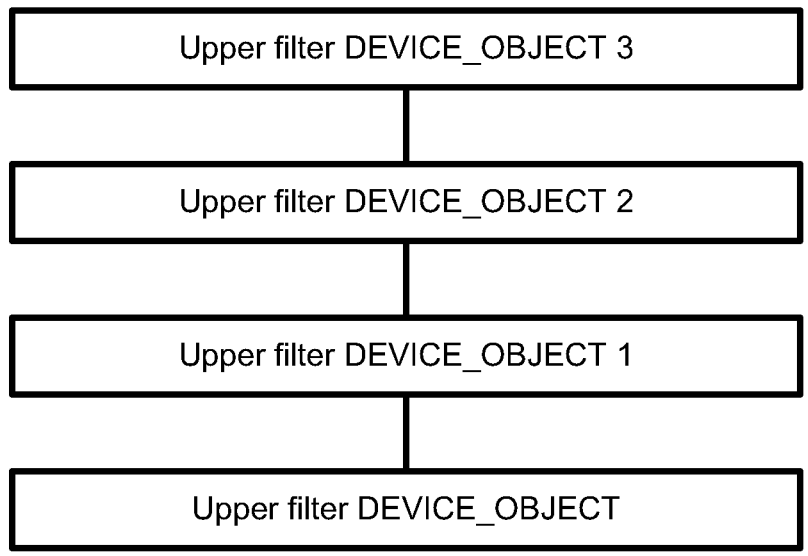
FIG. 1 is a block diagram schematic of a Windows operating system (referred to herein as "Windows") device stack.
Figure 2:
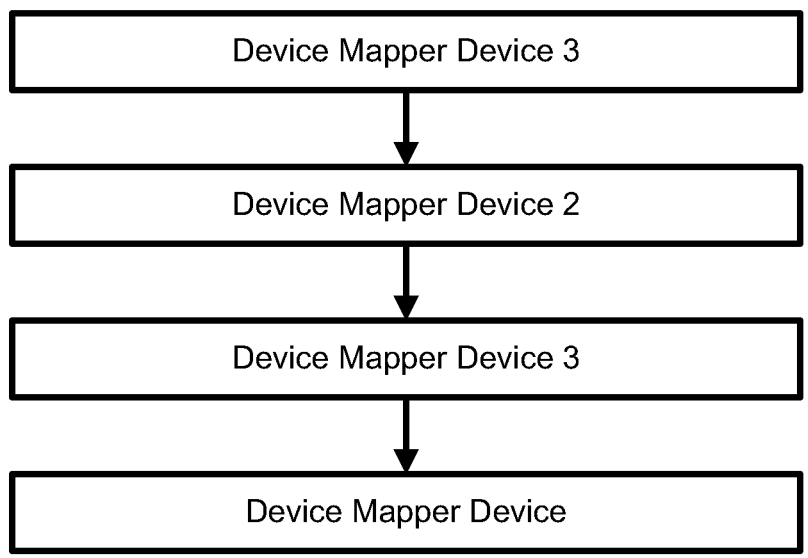
FIG. 2 is a block diagram schematic of a Linux operating system (referred to herein as "Linux") device stack.
Figure 3:
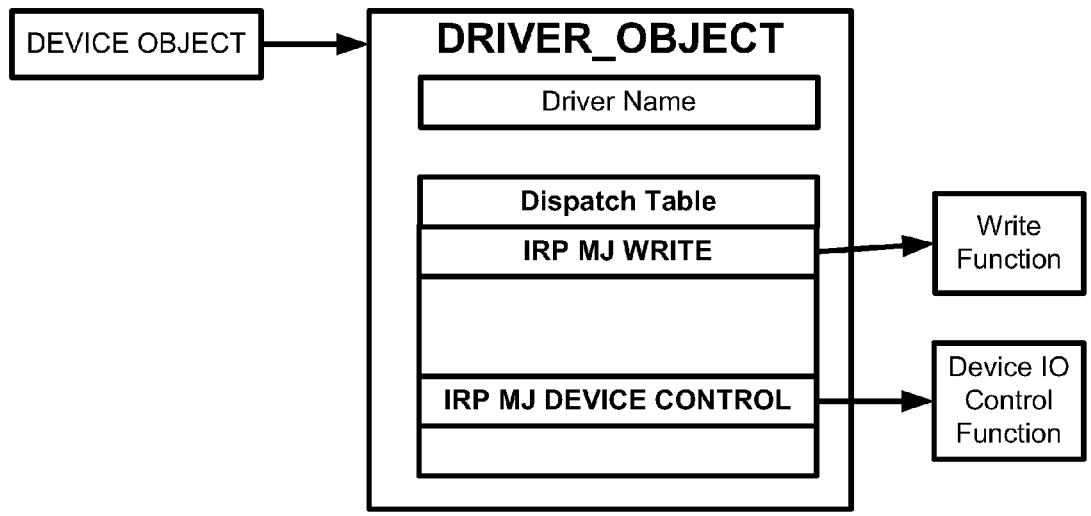
FIG. 3 is a block diagram schematic of a Windows driver object.

One or more embodiments of the present invention provide a method for installing a block-level write tracking driver in a Microsoft Windows™ operating system (referred to herein as "Windows") without having to reboot the system. In Windows, as illustrated in FIG. 3, each device object in a device stack contains a pointer to a corresponding driver object, and each driver object, among other things, contains the name of the driver and an IRP dispatch table. In addition, the IRP dispatch table contains an entry for each major IRP function (each entry is a function pointer). For example, there is an entry IRP_MJ_WRITE which is called for a write IRP, and there is an entry IRP_MJ_DEVICE_CONTROL which is called for a control IRP.

To provide a block-level write tracking driver in Microsoft Windows™ which tracks block-level writes to a particular volume in accordance with one or more embodiments of the present invention, a write tracking driver (for example and without limitation, a bitmap driver) finds the block device stack corresponding to this volume in a manner well known to those of ordinary skill in the art. After that, the write tracking driver selects a device object in the block device stack, preferably the top device object. Then, the write tracking driver accesses a driver object pointed to by the device object (refer to FIG. 3 which shows the device object pointing to the driver object). Then, the write tracking driver replaces (this operation is also referred to herein as patching) the following function pointer entries in a dispatch table in the driver object (refer to FIG. 3 which show the following pointers in the dispatch table): (a) the IRP_MJ_WRITE function pointer entry with a function pointer to a function that tracks direct writes; and (b) the IRP_MJ_DEVICE_CONTROL function pointer entry with a function pointer to a function that tracks indirect writes issued through certain IOCTL codes which allow an application to copy an area of a device without reading the data first. As one of ordinary skill in the art can readily appreciate from the above, the inventive method of "patching" a function pointer entry obviates the need for Windows to reboot the system to track writes.

Tracking writes to Volume Shadow Copy Service ("VSS") snapshot volumes in Windows takes place presently as follows. VSS uses a special driver called VolSnap to create snapshots. However, the VolSnap driver registers itself as an upper filter for the generic storage volume device class. Consequently, the VolSnap driver will have a filter device object in every block device stack in the system. VolSnap then uses these filter device objects to monitor block-level writes and to update a copy-on-write cache for the corresponding snapshots (if present). The same VolSnap driver is also responsible for exposing snapshots to the rest of the system as block devices. Consequently, the VolSnap driver not only filters IRP requests going through regular block device stacks but also processes read and write IRP requests issued to snapshot volumes.

In accordance with one or more embodiments of the present invention, the above-described property of the VolSnap driver may be used to track writes to snapshot volumes. To do this in accordance with one or more such embodiments, when choosing which device object to patch in a block device stack, the write tracking driver looks for a device object belonging to the VolSnap driver. Such a device object is identified by: (a) following a link from a device object to a driver object; and (b) comparing the driver name in the driver object to the name of the VolSnap driver (refer to FIG. 3 that shows where the driver name is stored in the driver object). Then, that driver object is patched. Once the VolSnap driver is patched, the write tracking driver (for example and without limitation, a bitmap driver) will see all read and write requests processed by the VolSnap driver. In more particular, when the write tracking driver gets to a block device stack, it looks through all device objects in the device stack to see if any of them belong to the VolSnap driver (i.e., by looking at the driver name for each device object in the device stack until it finds the VolSnap driver). If none is found, the write tracking driver chooses the driver that corresponds to the bottom device object in the device stack.

However, one problem in using the above-described method is how to distinguish between filter device objects created independently by the VolSnap driver in block device stacks and snapshot volumes. The VolSnap driver itself uses a special field in a device object extension to distinguish between filter device objects and snapshot device objects. As is well known to those of ordinary skill in the art, a device object extension is an arbitrary data structure that is opaque to Windows, but which Windows allows a driver to associate with device objects created by the driver. However, the format of the VolSnap device extension is not known and it can easily change between VolSnap versions. Another way of overcoming this problem would be to analyze the name of the device object. For example, snapshot device objects usually have names with either "snapshot" or "snap" in them. Although such an analysis could easily be performed by a human, it would be difficult to implement in a write tracking driver because snapshot device object names change between VolSnap versions. In fact, the name changes do not even follow the same pattern.

However, this problem is solved in accordance with one or more embodiments of the present invention by implementing a "promiscuous" mode for the write tracking driver. In accordance with one or more such embodiments, the write tracking driver assumes that a typical backup application usually backs up all volumes in a system. Consequently, in that case, the backup application asks the write tracking driver to track writes to all "working volumes." Thus, if the write tracking driver sees a write request being processed by the VolSnap driver (i.e., the driver name in a driver object corresponds to the VolSnap driver) and this write request is for a volume the write tracking driver does not recognize (i.e., it is not a "working volume"), when it is operating in the "promiscuous" mode, the write tracking driver assumes that the unrecognized volume is a snapshot volume. However, without having access to the device object extension, the write tracking driver cannot tell which "working volume" corresponds to this snapshot volume. To make sure no modified blocks are left untracked, in the promiscuous mode the write tracking driver marks as "dirty" (i.e., being modified) a range of blocks that corresponds to the write request in all volumes being tracked by the write tracking driver, refer to FIG. 5.

As one of ordinary skill in the art can readily appreciate, when the write tracking driver is operating in the "promiscuous" mode, it will mark more blocks as modified than are actually modified. However, this method ensures that all blocks that are really modified will be marked as modified. Thus, in accordance with one or more embodiments of the present invention, to avoid backing up too much data during each incremental backup cycle, a backup application should: (a) request the write tracking driver to turn on the "promiscuous" mode just before creating a VSS snapshot; and (b) request the write tracking driver to turn off the "promiscuous" mode immediately after the VSS snapshot is created. Thus, in accordance with this method, the write tracking driver will detect all writes to the snapshot while it is being created. Once the snapshot is created, it is assumed to be static, and thus, there is no need to track snapshot writes anymore.

There is a further problem that needs to be addressed when implementing the inventive method of patching function pointers described above, which problem relates to the possibility that several drivers could be trying to replace the same function pointer entry (such drivers will be referred to below as "patching" drivers). Generally speaking, each patching driver should store the previous function pointer entry, and then, when it is finished its work, forward the function call to the function associated with the previous function pointer entry. In addition, each patching driver must replace the previous function pointer entry when the patching driver is no longer needed. If a patching driver does not do the above, the following problem may occur. An incorrectly written patching driver may implement function pointer replacement (or patching) by first reading the current function pointer entry and then overwriting it with a new function pointer entry. However, if two patching drivers were trying to execute a read-then-write procedure for the function pointer (i.e., reading the current function pointer entry and overwriting it with a new function pointer entry) at the same time, it is possible that both of them will get the same function pointer entry but only one of them will replace the original function pointer entry. Consequently, one of the installed functions will never get called. In addition, if each patching driver needs to replace multiple function pointer entries, it is possible for one of them to replace one half of the function pointer entries and for the other to replace the other half. Since both patching drivers will assume that all function pointer entries were replaced, this could lead to program failures, system instability and data loss.

In light of the above, a well known approach to replacing a function pointer entry is to use an atomic read-and-write function that ensures that no other operations are done between the read and the write. If all patching drivers were to use these atomic read-and-write functions, all patching drivers would be guaranteed to replace all function pointer entries. However, if one of the patching drivers used a non-atomic read-then-write procedure, then all patching drivers in the system would be affected.

In accordance with one or more embodiments of the present invention, an inventive patching driver solves the above-described problem and coexists with other patching drivers as follows. Modern operating systems provide a set of functions for replacing a pointer atomically so that no other CPU instructions are executed while the pointer is being replaced. Specifically, in accordance with one or more embodiments of the present invention, a write tracking patching driver uses a function (for example and without limitation, a function called InterlockedCompareExchangePointer in Windows) that compares a function pointer entry to a specific value. If the function pointer entry matches the specific value, the function pointer entry is replaced with a predetermined value, and if the function pointer entry does not match the specific value, the function pointer entry is not replaced.

In accordance with one or more embodiments of the present invention, pseudo code shown in FIG. 6 is used by an inventive write tracking patching driver to patch a function pointer entry. If this code is executed while another thread is trying to replace the same function pointer entry (regardless of whether the tread is using an atomic operation or not), the inventive write tracking patching driver will continue looping without replacing the function pointer entry until it is guaranteed to be the only thread replacing this function pointer entry.

In accordance with one or more embodiments of the present invention, pseudo code shown in FIG. 7 is used by the write tracking driver when it needs to restore a function pointer entry to its original value (for example, when the driver has no more volumes to track). Note that, in accordance with one or more such embodiments, the function performed by the pseudo code shown in FIG. 7 replaces the function pointer entry only if the function pointer entry equals the function pointer entry put there by the patching driver. If the function pointer entry has changed, it means that another patching driver has patched the same function pointer entry and it is unsafe to replace the function pointer entry with the function pointer entry stored by the patching driver. If this happens, the patching driver should expect its patch function to be called at any time. However, since the write tracking driver is no longer interested in filtering requests for this particular driver, the patch function simply forwards the request to the previous function.

In accordance with one or more embodiments of the present invention, the write tracking driver takes special care when trying to patch the same driver again. If the write tracking driver has failed to remove its patch function pointer entry previously (this would occur, for example, because another patching driver has installed another patch function pointer entry on top of it), the write tracking driver should not patch this driver again. Since the write tracking driver's patch function pointer value is already installed, patching the same driver again could lead to performance degradation and even infinite loops when processing requests through this patch function.

It should be noted that it is unsafe to assume that once a patching driver has successfully removed all its patch function pointer entries, the patching driver can be unloaded from memory. It is possible that even if the driver's patch function is no longer in the patch chain, it may still be called. This could happen if someone were trying to call the patching driver's patch function just before the patching driver was trying to remove its patch. The caller might have read the patch function pointer entry just before it was replaced with the original function pointer entry. In this case the caller will call the patching driver's patch function even though the pointer to the patching driver's patch function is no longer present in the function pointer entry. Moreover, not only can the patching driver not be unloaded, the patching driver must keep the addresses of all function pointer entries it has ever replaced. These addresses will be used to forward calls the patching driver no longer needs to process, even if its patch function is not installed anymore.

Linux

Figure 4:
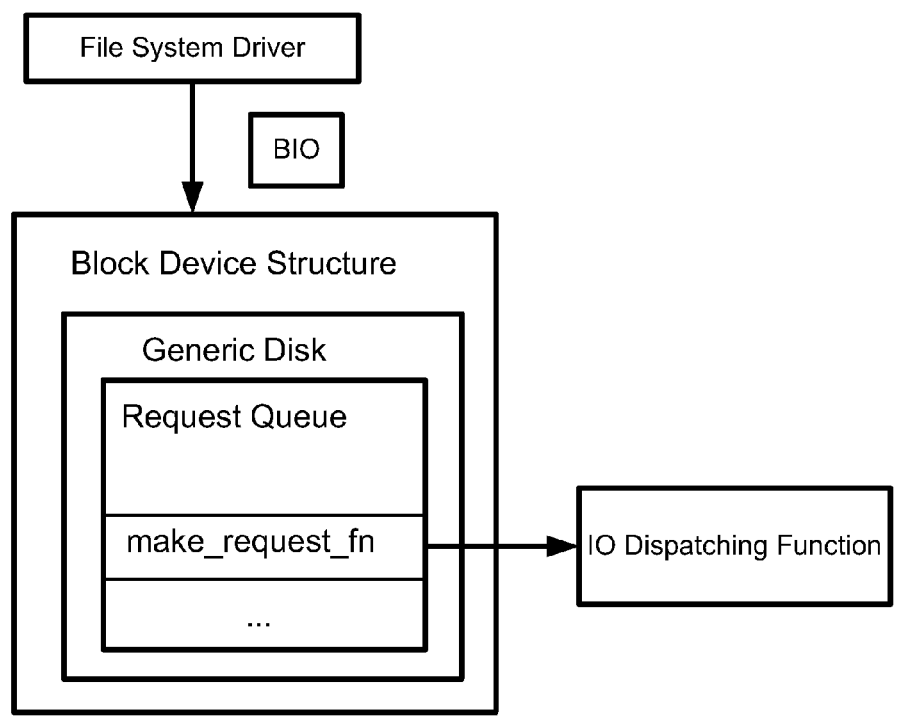
FIG. 4 is a block diagram of a Linux block device.

One or more embodiments of the present invention provide a method for installing a block-level write tracking Device Mapper in a Linux operating system (referred to herein as "Linux") without having to reboot. In Linux, as illustrated in FIG. 4, each block device has a request queue associated with it. The request queue queues block I/O ("BIO") requests, potentially reorders them, and then dispatches them to a device driver through an I/O dispatching function. As shown in FIG. 4, a request queue includes a make_request_fn function pointer entry that points to a function that is called when a BIO request is sent to the block device.

To provide a block-level write tracking driver in Linux which tracks block-level writes to a particular volume in accordance with one or more embodiments of the present invention, a write tracking driver (for example and without limitation, a bitmap driver) finds the block device structure for the block device using the block device's major/minor number in a manner well known to those of ordinary skill in the art. After that, it accesses a request queue in the block device structure, and finds the make_request_fn function pointer embedded in the request queue and replaces it with its own write tracking function pointer. As one of ordinary skill in the art can readily appreciate from the above, the inventive method of "patching" a function pointer entry obviates the need for Linux to reboot the system to track writes.

The same considerations regarding replacing pointers described above for Windows applies as well for Linux.

Further, as one of ordinary skill in the art can readily appreciate, by patching the boot volume in the above-described manner, the problem of write tracking the boot volume in Linux is solved.

One or more embodiments of the present invention may be implemented as one or more computer programs or as one or more computer program modules embodied in one or more computer readable media. The term computer readable medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

One or more embodiments of the present invention, including embodiments described herein, may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

Embodiments of the present invention described above are exemplary. As such, many changes and modifications may be made to the description set forth above by those of ordinary skill in the art while remaining within the scope of the invention. In addition, methods and mechanisms suitable for fabricating embodiments of the present invention have been described above by providing specific, non-limiting examples and/or by relying on the knowledge of one of ordinary skill in the art. Methods and mechanisms suitable for fabricating various embodiments or portions of various embodiments of the present invention described above have not been repeated, for sake of brevity, wherever it should be well understood by those of ordinary skill in the art that the various embodiments or portions of the various embodiments could be fabricated utilizing the same or similar previously described methods or mechanisms. As such, the scope of the invention should be determined with reference to the appended claims along with their full scope of equivalents.

What is claimed is:

1. A method of installing, by a processor, a block-level write tracking driver which tracks writes to a volume in an operating system, the method comprising:
   the write tracking driver:
   receiving a request to operate in a promiscuous mode;
   finding a block device stack corresponding to the volume;
   selecting a device object in the block device stack;
   accessing a driver object pointed to by the device object;
   comparing the driver name in the driver object to a name of a VolSnap driver;
   if the driver name is the same as the name of the VolSnap driver, replacing a function pointer entry in a dispatch table in the driver object; and
   if the driver name is not the same as the name of the VolSnap driver, do not replace the function pointer entry in the dispatch table in the driver object;
   wherein, in the promiscuous mode, when comparing the driver name, if a write request is being processed by the VolSnap driver and the volume is not recognized, marking a range of blocks as being modified that corresponds to the write request in all volumes being write tracked.

2. The method of claim 1 wherein replacing comprises the write tracking driver replacing an IRP_MJ_WRITE function pointer entry in the dispatch table for the selected device object with a function pointer to a function that tracks direct writes.

3. The method of claim 2 wherein replacing further comprises the write tracking driver replacing an IRP_MJ_DEVICE_CONTROL function pointer entry in the dispatch table for the selected device object with a function pointer to a function that tracks indirect writes.

4. The method of claim 1 which further comprises the write tracking driver:
   replacing an IRP_MJ_WRITE function pointer entry in the dispatch table for the selected device object with a function pointer to a function that tracks direct writes; and
   replacing an IRP_MJ_DEVICE_CONTROL function pointer entry in the dispatch table for the selected device object with a function pointer to a function that tracks indirect writes.

5. The method of claim 1 which further comprises:
   an application requesting the write tracking driver to turn on the promiscuous mode before creating a Volume Shadow Copy Service ("VSS") snapshot; and the application requesting the write tracking driver to turn off the promiscuous mode immediately after the VSS snapshot is created.

6. The method of claim 1 which further comprises the write tracking driver storing a previous function pointer entry.

7. The method of claim 6 which further comprises the write tracking driver replacing the stored function pointer entry when the write tracking driver is no longer needed.

8. The method of claim 7 wherein replacing comprises:
comparing the function pointer entry to be replaced with the stored function pointer entry; and
replacing the function pointer entry if the function pointer entry to be replaced is the same as the stored function pointer entry.

9. The method of claim 1 which further comprises the write tracking driver forwarding the function call to a function pointed to by a previous function pointer entry when the write tracking driver is finished processing a write request.

10. The method of claim 1 wherein replacing comprises:
determining whether another driver is trying to replace the function pointer entry; and
replacing only when no other driver is trying to replace the function pointer entry.

11. A method of installing, by a processor, a block-level write tracking driver which tracks writes to a block device in an operating system, the method comprising:
the write tracking driver:
finding a block device structure corresponding to the block device, wherein the block device is a boot volume;
accessing a request queue in the block device structure; and
replacing a make request fn function pointer entry in the request queue for the block device with a function pointer to a function that tracks direct writes.

12. A method of installing, by a processor, a block-level write tracking driver which tracks writes to a volume in an operating system, the method comprising:
the write tracking driver:
receiving a request to operate in a promiscuous mode;
finding a block device stack corresponding to the volume;
iterating through the block device stack, starting at a device object on top of the stack;
(a) for the next device object in the device stack, accessing a driver object pointed to by the device object;
(b) comparing the driver name in the driver object to the name of a VolSnap driver;
if the name is the same, replacing a function pointer entry in a dispatch table in the driver object;
if the name is not the same, returning to (a) until the last device object in the device stack is reached; and
replacing a function pointer entry in a dispatch table in the driver object pointed to by the last device object in the device stack;
wherein, in the promiscuous mode, when comparing the driver name, if a write request is being processed by the VolSnap driver and the volume is not recognized, marking a ranqe of blocks as being modified that corresponds to the write request in all volumes being write tracked.

13. A non-transitory computer-readable storage medium containing instructions for causing a computer system to carry out a method of installing a block-level write tracking driver which tracks writes to a volume in an operating system, the method comprising:
the write tracking driver:
receiving a request to operate in a promiscuous mode;
finding a block device stack corresponding to the volume;
selecting a device object in the block device stack;
accessing a driver object pointed to by the device object;
comparing the driver name in the driver object to a name of a VolSnap driver; and
if the driver name is the same as the name of the VolSnap driver, replacing a function pointer entry in a dispatch table in the driver object; and
if the driver name is not the same as the name of the VolSnap driver, do not replace the function pointer entry in the dispatch table in the driver object;
wherein, in the promiscuous mode, when comparing the driver name, if a write request is being processed by the VolSnap driver and the volume is not recognized, marking a range of blocks as being modified that corresponds to the write request in all volumes being write tracked.

14. A non-transitory computer-readable storage medium containing instructions for causing a computer system to carry out a method of installing a block-level write tracking driver which tracks writes to a block device in an operating system, the method comprising:
the write tracking driver:
finding a block device structure corresponding to the block device, wherein the block device is a boot volume;
accessing a request queue in the block device structure; and replacing a make request fn function pointer entry in the request queue for the block device with a function pointer to a function that tracks direct writes.

* * * * *